Feb. 12, 1935.   O. STEFFEN   1,990,715
SLICING DEVICE
Filed April 5, 1933    3 Sheets-Sheet 1
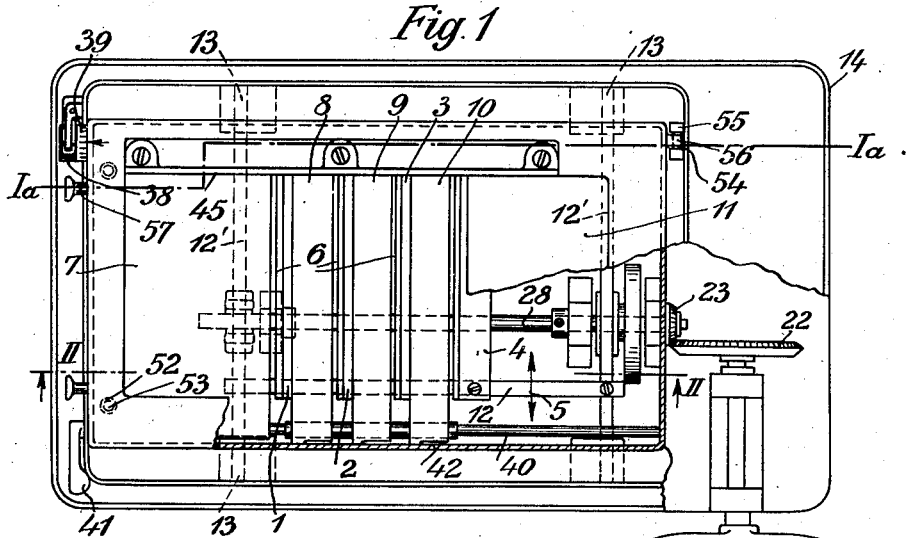
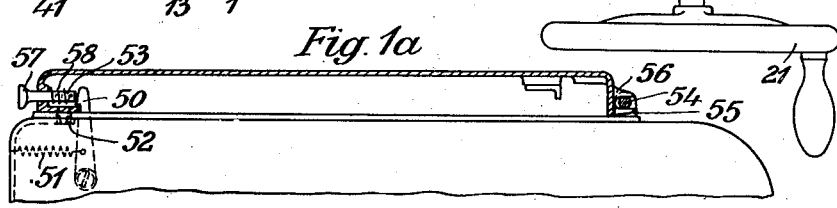
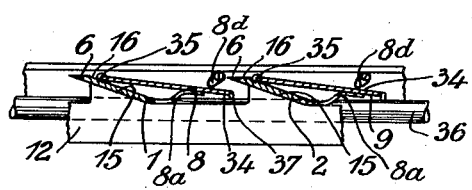
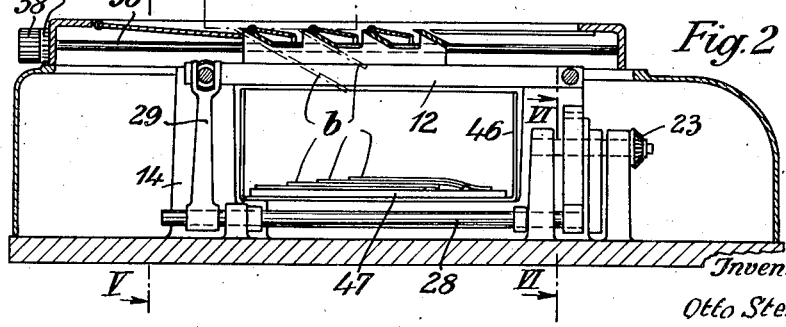
Inventor
Otto Steffen Feb. 12, 1935. O. STEFFEN 1,990,715
SLICING DEVICE
Filed April 5, 1933 3 Sheets-Sheet 2
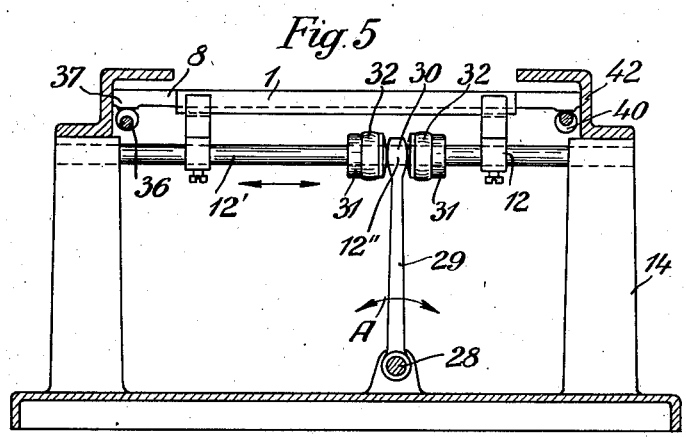
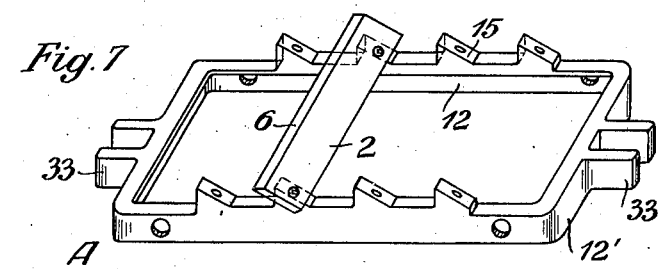
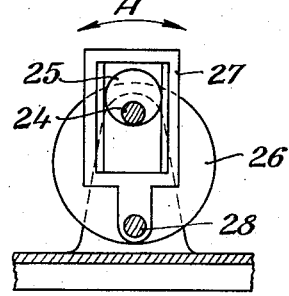
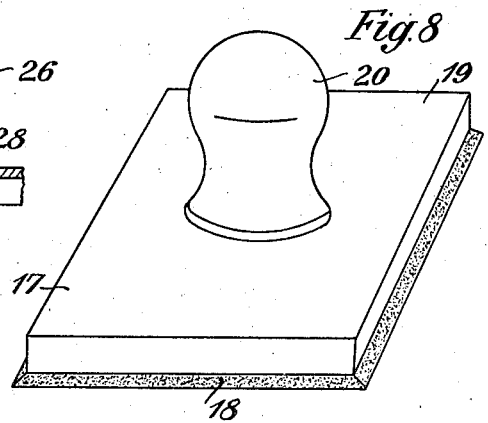
Inventor
Otto Steffen
by: *Attorney*

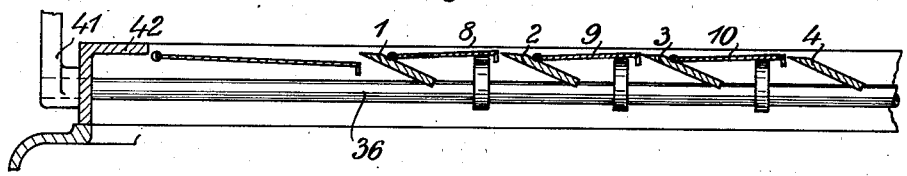
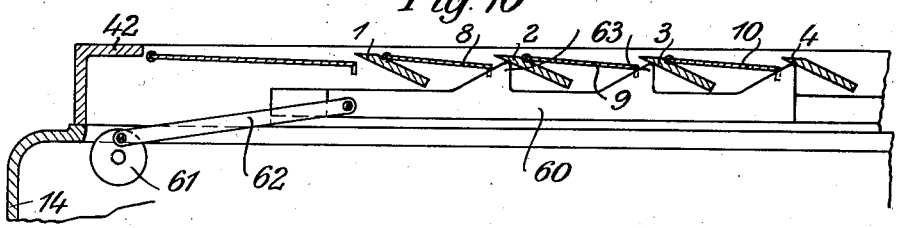
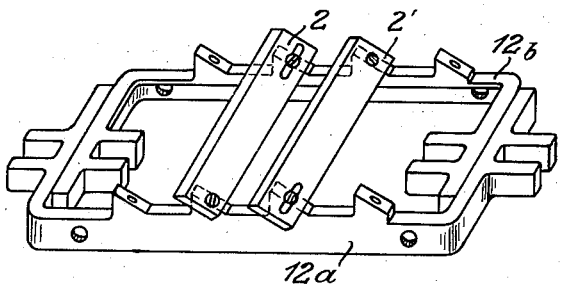

Patented Feb. 12, 1935

1,990,715

UNITED STATES PATENT OFFICE 1,990,715

SLICING DEVICE

Otto Steffen, Berlin, Germany

Application April 5, 1933, Serial No. 664,462
In Germany December 24, 1931

8 Claims. (Cl. 146—151)

I have filed applications in Germany December 24, 1931, and in Austria March 20, 1933.

This invention has reference to slicing devices and in particular slicing machines for the handling of alimentary products, such as meat, sausages, ham, head-cheese, bread and various kinds of pastry, cheese and similar alimentary and other products, and it is intended among other important objects and advantages to improve the means of adjusting the thickness of the slices to be obtained and the accuracy of the cut, to provide improved guiding and retaining means for the goods, so that the material may be used up completely and carefully sliced even to the last remnant, and to facilitate the cleaning and exchanging of the important parts of the device. The invention broadly considered refers particularly to that kind of slicing machines in which the cutting is effected by means of reciprocating knives, and it is one of the important objects of this invention to adapt the machine to the cutting of several slices by a single operation. This result is accomplished by providing stationary, that is to say independent guiding means which will not participate in the movement of the knives both in front of the first knife and at the rear of the last knife, but also intermediate of the individual knives. By this means it becomes possible to cut off complete slices of any thickness desired even in the case of very soft sausages, crumbling sausages, polonies and the like, and in this connection provision may be made to adjust all or part of such guiding means, and in a preferred construction the adjustability may be further increased by providing means of changing the vertical position of the cutting edge of the succeeding knife in the feeding direction relatively to the rear edge of the preceding guiding means or inversely. A universal adjusting device common to all the several guiding members may be preferably provided, so that the slices cut in one and the same operating step will be of substantially identical thickness. All the guiding means and preferably also the adjusting means thereof may be disposed in a common frame, box or the like which is detachably secured to the machine. Inasmuch as in the operation of the machine the dirt and refuse accumulate particularly on the lower side of the knives and on the frame or box referred to, the parts become accessible for cleaning purposes by the ready removing of this frame with the guiding members, so that the knives are likewise exposed. This easy removability of the frame with the guiding means is moreover of advantage, when it is desired to grind the cutting edges of the blades which may be readily effected in machines according to this invention by placing a grinding stone upon the cutting edges of the reciprocating knives or by reciprocating such stone upon the cutting edges.

Very often it is desired to cut off one slice only, so as to complete a desired weight, or in order to work up small sausage ends or the like, and in view of such purposes provision is made for the throwing out of operation of part of the knives, or of all knives but one, which is effected substantially by the shielding off or covering of the cutting edges of the respective knives by operating the corresponding guiding members by suitable easily operated means, handles or the like.

Other objects and advantages of the invention will appear as the specification proceeds and from an inspection of the drawings and claims. On the accompanying drawings I have shown my invention by way of exemplification in a preferred embodiment with the understanding that it is not intended to thereby exclude other possible realizations of the principles of my invention, as hereinafter explained. In the drawings:—

Figure 1 is a plan view of such an embodiment. Figure 1ª is a fragmentary sectional view on the section-line Iª in Figure 1.

Figure 2 is a section on the line II—II of Figure 1. Figure 3 is a detail of this sectional view on an enlarged scale. Figure 4 shows a somewhat modified detail on an enlarged scale and in vertical section. Figure 5 is a section of Figure 2 on the line V—V thereof, and likewise on an enlarged scale. Figure 6 is a section through several important details on the line VI—VI of Figure 2 on an enlarged scale. Figure 7 is a perspective view of a modified arrangement of knives on an enlarged scale; Figure 8 illustrates grinding means in connection with this invention and on an enlarged scale. Figures 9, 10, 11 and 12 are diagrammatic showings of details to be referred to.

The device, as appears from the drawings, is provided with a plurality of knife-blades 1, 2, 3, 4 which are reciprocated in the direction of their cutting edges, that is to say, according to the arrow 5. The cutting edges 6 of the knives may be straight or curved and may extend according to any kind of suitable curves. In accordance with the invention a guiding surface, 7, 8, 9, 10, 11 is provided in front of each knife the leading edges 34 of said guides being arranged, so as to feed the material to be cut to the succeeding cutting edge and being vertically adjustable with relation to said cutting edge. The material to be cut or sliced is moved along said guiding surface during the cutting operation. In order to cause the knives to become engaged with the material, as for instance with the meat or sausage, the leading edges 34 of the knives are placed somewhat below the cutting edges of the knives, and for this purpose either the guiding means as a whole or their leading edges should be made adjustable. The guiding means are preferably carried by a universal frame 42 which is secured to the machine frame, so as to be easily detachable therefrom. A particularly suitable fastening of the frame on the machine is shown for instance in Figures 1 and 1ᵃ of the drawings. The studs 54 are for instance secured to the supports 55 on the machine frame and fork-shaped projections 56 on the narrow side of the frame 42 become engaged with the studs or pivots 54, when the frame 42 is properly positioned, so that the frame may be swung on the pivots in a hinge-like manner. The frame is preferably lowered upon the studs 54 in a substantially vertical direction and is then forced down upon the knives. When the frame 42 rests upon the carrying frame the pins 53 on the underside of the frame 42 and preferably conical become engaged with openings 52 of the machine frame and thereby adjust the frame 42, so that its guides 7, 8, 9 and the like are disposed exactly opposite the cutting edges 6 of the knives. In order to lock the frame 42 in its operating position pawls 50 are provided which are acted upon by springs 51 and become engaged with the inwardly curved lower edge of the frame 42 at its side opposite the fork-shaped projections 56. In order to disengage the pawls 50 press-buttons 57 are provided which by means of a push-rod 58 cause the disengagement of the pawls 50. Thus, in order to be able to clean the guide members and the knives below the same it is only necessary to operate the press-button 57 and to turn the frame in a hinge-like manner on the studs 54 in the upward direction and to lift it off from the studs 54. By this means the cleaning of the parts is facilitated, particularly in view of the fact that the dirt, grease and the like adhere to the lower side of the knives and to the guide surfaces. It is very easy to wash and clean the frame 42 with the parts carried thereby, after its being removed from the machine, and in the meantime the lower sides of the knives may be likewise cleaned.

The knives 1—4 are likewise secured in a common frame 12, 12′ which is reciprocally movable and by means of pins or studs 13 is displaceably mounted in the machine frame 14 which forms a unit with the base plate. The knives are preferably mounted on the frame 12, 12′ by means of inclined surfaces 15 and they may be advantageously disposed in such a manner that the blades or cutting and grinding surfaces 16 are upwardly directed, as appears from Figure 3, so that they may be easily ground. The grinding may be effected by means of a flat grinding device 17 which preferably comprises a grinding plate 18 and a holder 19 with operating handle 20 (Figure 8), the operation being preferably carried on by moving the knives after detaching the frame 42, and then pressing the grinding means shown in Figure 8 against the upper side of the cutting edges of the knives or by moving the grinding means with a gentle pressure along the upper side of the cutting edges or moving the knives while keeping the grinder in this position. This subsequent grinding of the knives may, of course, also be effected when the cutting edges are not upwardly directed.

The knives may be moved at right angle with relation to the feeding movement of the goods to be sliced or at an acute or obtuse angle with relation thereto. The reciprocation of the knife-frame 12 may be effected manually or by power or by both. In the drawings manual operation has been shown by way of example by means of a hand wheel 21 and a transmission gearing 22, 23. The wheel 23 is disposed upon a shaft 24 provided with a crank or an eccentric 25 and a balancing weight 26. The operation will preferably be effected by an electric motor or the like. Upon the rotation of the shaft 24 a frame 27 may be moved in the direction of the arrows A which is arranged on a shaft 28 and is adapted to transmit the oscillatory movement to a lever 29 (Figure 5) which is operatively connected to the knife frame 12, 12′. The lever 29 has a fork-shaped member 30 engaging part 12″ of the knife frame. In order to insure smooth movement and to avoid jerks spring-acted members or rubber-cushions 32, buffers or the like are arranged between corresponding enlargements or shoulders 31. It is, of course, also possible to have the frame, crank or the like 27 move the knife frame directly. It is however of advantage to dispose the operating connection at the knife which is the first in the direction of cut. It is also possible and admissible to provide two rocking arms on the rocking shaft 28 instead of but one arm, and such arms may obviously be caused to operate at two points of the knife frame. In Figure 5 an exemplification of a knife frame is shown which is provided with two small forked projections 33 for connection with two rocking levers or the like. This knife frame is moreover arranged so as to be slidable upon fixed guide rods, not shown in the drawings.

It should be pointed out in this connection that the knives may also be actuated in any other suitable manner.

It has already been pointed out that the leading edges 34 of the guiding surfaces may be vertically adjusted with relation to the cutting edges of the knives. For the purpose of this adjustment of the edges 34 an eccentric shaft 36 has been provided upon the eccentric portion of which shaft 36 the leading or rocking edges 34 of the guide surfaces are supported, for instance by means of feet 37. By the rotation of the shaft 36 the leading edges 34 are raised or lowered in accordance with the direction of rotation, and preferably against the action of springs, of leaf springs 8ᵃ for instance, and the slices to be cut will accordingly be of different degrees of thickness. For the rotation of the shaft 36 a button 38 may be employed, preferably provided with a graduation 39 to indicate the adjusted thickness of the slices. Furthermore, the shaft 36 may preferably be provided with locking or arresting means, as for instance with a pawl and socket or the like, so as to secure the shaft in its adjusted position. This is shown for instance in Figure 9 of the drawings.

In the exemplification just described it is of importance that the rocking shafts 35 for the guide surfaces should be arranged directly above and at the rear of the cutting edges 6 of the preceding knives, and that the back face of these guiding means opposite the leading edges 34 should be in line or approximately in alignment with the respective rocking shaft 35. By this means the important result is accomplished that the material to be operated upon, food or the like, after it has passed the cutting edge 6 of a knife, is prevented from being caught and clamped between said knife and the succeeding guiding member 8, and the material is thereby compelled to immediately engage a relatively fixed guiding surface directly at the rear of the cutting edge 6 of a knife.

In this connection it has been found to be of advantage that the guiding surface 11 disposed behind the last knife, though it has no influence upon the thickness of the cut slices, should be adjustably disposed, so that its inclination may be exactly adapted to the inclination of the other guiding surfaces. By this means the piece of food or the like operated upon is caused to move along guiding surfaces of equal inclination from the beginning to the termination of the cutting operation, which is of importance with regard to the uniformity of the cut and the abrupt dropping and rupture and irregular cutting of the last slice are thereby obviated.

It is frequently required to cut one slice only, instead of cutting a plurality of slices simultaneously, and in view thereof and possibly for other purposes means have to be provided which will allow of rendering the knives inoperative which become unnecessary in such cases. Such means comprise an eccentric shaft 40 Figures 1 and 5 the eccentric portion of which however will engage below those guiding members the corresponding knives of which are to be rendered inoperative, these being for instance the guiding surfaces 8, 9 and 10 in the exemplification shown.

The mode of operation of the switching-out means referred to is substantially as follows:—
If it is desired that the knives 2, 3, 4 should not cut, and that only the knife 1 should remain operative, the eccentric shaft 36 is rotated by means of an operating lever 41, whereby the leading rocking edges 34 of the guide surfaces are raised to such an extent that they will be positioned above the cutting edges of the respective knives, so that the latter are unable to become engaged with the piece to be cut and are therefore switched out of operation. This is illustrated diagrammatically in Fig. 9 of the drawings.

Instead of the eccentric shafts 36 and 40 other equivalent means may be employed for the adjustment of the guiding means, thus the mechanism may for instance comprise the substitution of the rotatable shafts by longitudinally displaceable bars with inclined ascending guiding means for the adjustment of the individual knives, such bars or rods being reciprocated by means of eccentric or bevel gearing. With all these structures it is of importance that the means for the adjustment of the guiding means which are carried by the adjustable frame 42, as well as the arrangement of the guiding surfaces themselves should be such that the frame 42 with the guiding means and with the mechanisms referred to may be detached and may be readily washed for the purpose of cleaning without any necessity of lubrication. The mechanism for the adjustment of the guide surfaces may, of course, also be arranged upon the supporting frame, so that this adjusting mechanism acts upon the guiding means and operates the same only in the operative position of the guiding surfaces. An embodiment of this kind is shown in Figure 10 of the drawings. In this figure the supporting frame 14 carries for instance a frame, bar or the like 60 which is provided with cams, shoulders or the like 63 and which may for instance be reciprocated by a crank or eccentric disc 61 and link connection 62, so that the guiding surfaces which are disposed on the upper removable frame, may be accordingly adjusted upon becoming engaged with the shoulders, projections or the like 63 of the supporting or base frame 14.

The function and operation of the guiding surfaces referred to has been illustrated in Figure 2 of the drawings in which at B is shown a piece of sausage or the like which is moved in the direction C, and from which the slices $b$ are cut off by the device.

In Figure 11 of the drawings I have shown diagrammatically an embodiment of the guide surfaces 8 and the like which are provided on their upper surfaces with longitudinal flutings $8^b$. These are provided with a view of assisting the operation of the guide surfaces and of preventing lateral movement of the material to be cut which is otherwise likely to occur by the movement of a plurality of knives, and by this means it becomes possible to operate with the machine upon very soft, crumbling and but loosely cohering masses, such as soft liver sausage for instance without any danger of tearing or spoiling the slices cut.

The guiding surfaces may be made in one piece, if desired, and as shown in Figure 4 of the drawings. The guiding means in this case constitute a plate 44 with a plurality of slots through which the knives are adapted to pass. This plate 44 may be raised and lowered with relation to the other parts.

On one side of the machine above the guide surfaces and above the knives stopping means, such as for instance an angular piece 45 may be secured by screws and the like along which the goods to be sliced may be guided and which may be made adjustable in an obvious manner.

The space below the knives is preferably provided with a box or the like 46 for the reception of the cut slices, so that particles of oil or other dirt from the moving parts of the machine are prevented from reaching the ready merchandise. The box 46 may be preferably provided with a removable slide, plate or dish 47 for the finished slices. In accordance with a special feature of the machine the slide or dish 47 may be used as a scale pan for balances, so as to admit of the immediate checking of the weight of the cut slices.

The reciprocating movement of the knives and the like may be effected, if desired by one or several electromagnets which may cooperate with other electromagnets or springs and not shown on the drawings.

As regards the knife frame it should be pointed out that, instead of using one frame 12, 12', the knives may be staggeringly or alternatingly arranged and operated by means of two different knife-frames $12^a$, $12^b$ shown in Figure 12 of the drawings. These frames are adapted to be reciprocated one towards the other, so that the knives disposed thereon will be likewise moved in opposite directions. With this arrangement of the knives and the knife frame there is the important advantage that counterweights may be dispensed with, which are otherwise rather indispensable, in order to prevent excessive vibration of the parts.

The guiding members, plates 8 and the like, may be pivotally disposed in the guide frame or knife frame by means of pointed studs or the like 8c at their leading edges, as indicated in Figure 11 of the drawings, so as to insure promptness of movement and to obviate friction. The pivoting points of said guide surfaces are preferably near the knives or as adjacent as possible thereof, so as to avoid seizing and clamping the material between the knives and the guides.

The device according to this invention among other important uses is particularly suitable for use in food stores, butcher stores and the like for the sale of sliced merchandise, "boiled dinners", in bakeries and for similar uses in the arts. By the use of this invention the goods, such as alimentary products, may be divided and sliced into sections of any desired thickness and of unaltering superior, pleasing condition.

It should also be pointed out in this connection that, while I have described the invention in detail in several exemplifications, it should be pointed out that it may find expression in other embodiments and may be further modified in accordance with the requirements of the user without thereby deviating from the principles of the invention, as expressed in the appended claims.

I claim:—

1. In a slicing machine in combination, a plurality of spacedly and serially disposed substantially parallel cutting knives, means effecting a bodily movement of said knives, flap-like, adjustable guiding means intermediate said knives and opposite the cutting surfaces thereof and spaced from said knives and stationarily mountable with relation to said knives and engageable therewith and adapted for inclination substantially in the same direction.

2. In a slicing machine in combination, a plurality of spacedly and serially disposed, substantially parallel cutting knives, reciprocable in the direction of their cutting edges, substantially flap-like, rockably adjustable guiding means intermediate said knives and spaced therefrom and capable of inclination towards said knives and stationarily mountable with relation to said knives and adjusting means for the guiding means engageable with the terminal free portions of said guiding means.

3. In a slicing machine in combination a plurality of spacedly disposed reciprocably movable cutting blades, guiding flaps spacedly intermediate such blades and inclinable towards the same and stationarily mountable with relation to such blades, framing connecting such guiding flaps and detachably mountable around such blades in cooperative relation therewith.

4. In a slicing machine in combination, a bipartite frame, comprising two oppositely and axially reciprocable supporting sections, a plurality of substantially spaced parallel, substantially equally inclined, transversely movable cutting knives on said sections and adjustable and inclinable guiding means intermediate said knives, stationarily mountable with relation thereto and confronting the broad surfaces thereof.

5. In a slicing machine in combination, a plurality of substantially parallel, spacedly and serially disposed cutting knives, reciprocable codirectionally with their cutting edges, substantially flap-like, adjustably inclinable guides spacedly disposed intermediate the knives and confronting the same and rockingly mounted at the rear of the upper cutting portion of said knives and stationarily securable with relation to said knives.

6. In a slicing machine in combination, a plurality of substantially parallel, spacedly disposed and transversely reciprocable cutting knives, substantially flap-like, rockably adjustable, and stationarily mountable work guides facing the broad surfaces of said knives and spacedly disposed intermediate thereof and a fluted surface section on the outside of said flaps grooved in the direction of the rocking movement of such flaps.

7. In a slicing machine, a plurality of spaced knives, means to reciprocate said knives in the direction of their cutting edges, guiding means arranged adjacent opposite edges of said knives and held stationary during movement of the latter, a portion of said guiding means being adjustable with respect to said knives, and means for simultaneously imparting the adjustment to said portion of the guiding means.

8. In a slicing machine, a plurality of spaced knives, means to reciprocate said knives in the direction of their cutting edges, guiding means arranged adjacent opposite edges of said knives and held stationary during operation of the latter, a portion of said guiding means being adjustable with respect to said knives, means for simultaneously imparting the adjustment to said portion of the guiding means, and further means for adjusting a predetermined number of said guiding means and thereby making inoperative the knives cooperating with said adjusted guiding means.

OTTO STEFFEN.